United States Patent
Chen

(10) Patent No.: US 9,231,861 B2
(45) Date of Patent: Jan. 5, 2016

(54) LABEL SWITCHED PATH NETWORK FAILURE DETECTION AND TRAFFIC CONTROL

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/160,875

(22) Filed: Jan. 22, 2014

(65) Prior Publication Data

US 2014/0355414 A1 Dec. 4, 2014

Related U.S. Application Data

(60) Provisional application No. 61/828,099, filed on May 28, 2013.

(51) Int. Cl.
*H04L 12/703* (2013.01)
*H04L 12/24* (2006.01)
*H04L 12/707* (2013.01)
*H04L 12/723* (2013.01)

(52) U.S. Cl.
CPC ............ *H04L 45/28* (2013.01); *H04L 41/0659* (2013.01); *H04L 45/22* (2013.01); *H04L 45/50* (2013.01)

(58) Field of Classification Search
USPC ......... 370/217, 218, 219, 220, 221, 225, 228, 370/242, 244, 386, 389, 395.5, 400, 401; 709/239
See application file for complete search history.

(56) References Cited

U.S. PATENT DOCUMENTS

| | | | | |
|---|---|---|---|---|
| 2005/0013242 | A1* | 1/2005 | Chen et al. | 370/228 |
| 2007/0097857 | A1* | 5/2007 | Zhai | 370/218 |
| 2007/0280102 | A1* | 12/2007 | Vasseur et al. | 370/225 |
| 2010/0177631 | A1 | 7/2010 | Chen et al. | |
| 2011/0199891 | A1 | 8/2011 | Chen | |

OTHER PUBLICATIONS

Chen, H., "Extensions to RSVP-TE for P2MP LSP Ingress Local Protection", draft-chen-mpls-p2mp-ingress-protection-00.txt, Feb. 28, 2010, 12 pages.
Chen, H., et al., "Extensions to RSVP-TE for P2MP LSP Ingress Local Protection", draft-chen-mpls-p2mp-ingress-protection-01.txt., Jul. 12, 2010, 14 pages.

(Continued)

*Primary Examiner* — Edan Orgad
*Assistant Examiner* — Saumit Shah
(74) *Attorney, Agent, or Firm* — Conley Rose, P.C.; Grant Rodolph; William H. Dietrich

(57) ABSTRACT

A method for providing ingress fault protection in a label switched network, comprising sending data traffic from a source node to a first label switched path (LSP) via a first ingress node, detecting a first fault using a first fault detection link between the source node and the first ingress node, sending the data traffic from the source node to a second LSP via a second ingress node in response to detecting the first fault, detecting a second fault using a second fault detection link between the first ingress node and the second ingress node, and merging the data traffic from the second LSP into the first LSP at a next-hop node of the first ingress node, wherein the data traffic is no longer sent to the first LSP via the first ingress node after the first fault.

20 Claims, 8 Drawing Sheets

(56) References Cited

OTHER PUBLICATIONS

Chen, H., et al., "Extensions to RSVP-TE for P2MP LSP Ingress Local Protection", draft-chen-mpls-p2mp-ingress-protection-02.txt, Jan. 11, 2011, 14 pages.
Chen, H., et al., "Extensions to RSVP-TE for P2MP LSP Ingress Local Protection", draft-chen-mpls-p2mp-ingress-protection-03.txt, Jul. 11, 2011, 12 pages.
Chen, H., et al., "Extensions to RSVP-TE for P2MP LSP Ingress Local Protection", draft-chen-mpls-p2mp-ingress-protection-04.txt, Oct. 30, 2011, 11 pages.
Chen, H., et al., "Extensions to RSVP-TE for P2MP LSP Ingress Local Protection", draft-chen-mpls-p2mp-ingress-protection-05.txt, Mar. 13, 2012, 13 pages.
Chen, H., et al., "Extensions to RSVP-TE for P2MP LSP Ingress Local Protection", draft-chen-mpls-p2mp-ingress-protection-06.txt, Jul. 16, 2012, 13 pages.
Chen, H., et al., "Extensions to RSVP-TE for P2MP LSP Ingress Local Protection", draft-chen-mpls-p2mp-ingress-protection-07.txt, Oct. 22, 2012, 16 pages.
Chen, H., et al., "Extensions to RSVP-TE for P2MP LSP Ingress Local Protection", draft-chen-mpls-p2mp-ingress-protection-08.txt, Feb. 25, 2013, 17 pages.
Chen, H., et al., "Extensions to RSVP-TE for P2MP LSP Ingress Local Protection", draft-chen-mpls-p2mp-ingress-protection-09.txt, Oct. 21, 2013, 28 pages.
Chen, H., et al., "Extensions to RSVP-TE for P2MP LSP Ingress Local Protection", draft-chen-mpls-p2mp-ingress-protection-10.txt, Dec. 26, 2013, 28 pages.
Le Roux, J.L., et al., "P2MP MPLS-TE Fast Reroute with P2MP Bypass Tunnels", draft-leroux-mpls-p2mp-te-bypass-01.txt, Mar. 2007, 12 pages.
Reynolds, J., et al., "Assigned Numbers", RFC 1700, Oct. 1994, 231 pages.
Bradner, S., "Key words for use in RFCs to Indicate Requirement Levels", RFC 2119, Mar. 1997, 4 pages.
Braden, R., et al., "Resource Reservation Protocol (RSVP)—Version 1 Functional Specification", RFC 2205, Sep. 1997, 113 pages.
Awduche, D., et al., "Requirements for Traffic Engineering Over MPLS", RFC 2702, Sep. 1999, 30 pages.
Rosen, E., et al., "Multiprotocol Label Switching Architecture", RFC 3031, Jan. 2001, 62 pages.
Rosen, E., et al., "MPLS Label Stack Encoding", RFC 3032, Jan. 2001, 24 pages.
Awduche, D., et al., "RSVP-TE: Extensions to RSVP for LSP Tunnels", RFC 3209, Dec. 2001, 62 pages.
Berger, L., "Generalized Multi-Protocol Label Switching (GMPLS) Signaling Resource Reservation Protocol-Traffic Engineering (RSVP-TE) Extensions", RFC 3473, Jan. 2003, 43 pages.
Narten, T., "Assigning Experimental and Testing Numbers Considered Useful", RFC 3692, Jan. 2004, 8 pages.
Pan, P., et al., "Fast Reroute Extensions to RSVP-TE for LSP Tunnels", RFC 4090, May 2005, 39 pages.
Yasukawa, S., "Signaling Requirements for Point-to-Multipoint Traffic-Engineered MPLS Label Switched Paths (LSPs)", RFC 4461, Apr. 2006, 31 pages.
Aggarwal, R., et al., "Extensions to Resource Reservation Protocol—Traffic Engineering (RSVP-TE) for Point-to-Multipoint TE Label Switched Paths (LSPs)", RFC 4875, May 2007, 54 pages.

* cited by examiner

LABEL SWITCHED PATH NETWORK FAILURE DETECTION AND TRAFFIC CONTROL

CROSS-REFERENCE TO RELATED APPLICATIONS

The present application claims benefit of U.S. Provisional Patent Application No. 61/828,099 filed May 28, 2013 by Huaimo Chen and entitled, "System And Method For Detecting Failure And Controlling Traffic," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a conventional multiprotocol label switching (MPLS) traffic engineering (TE) label switching path (LSP) system, a second LSP may be employed as a backup LSP to the first LSP to protect the first LSP in the event of a primary ingress node fault. The second LSP may be resource consuming because the second LSP may require additional network bandwidth that can be comparable to the reserved bandwidth of the first LSP. Furthermore, the second LSP may reroute data traffic that causes a delay in traffic delivery. Such a delay may not be acceptable in some systems (e.g., for real time services such as internet protocol (IP) television). Additionally, conventional systems may also incorrectly detect a fault of the primary ingress node for the first LSP. An incorrect failure detection of the primary ingress node may result in both the primary ingress node of the first LSP and a backup ingress node of the second LSP delivering the same data traffic to a next hop node of the primary ingress node. The duplicate traffic being delivered to the next hop node of the primary ingress node may cause service interruptions.

SUMMARY

In one example embodiment, the disclosure includes a label switched network to provide ingress fault protection of a primary LSP. Data traffic for the primary LSP may be sent from a source node to the primary LSP via a primary ingress node. A first fault detection link may detect a first fault in a connection between the source node and the primary ingress node. Upon detecting the first fault, the source node may switch sending data traffic from the primary ingress node to a backup LSP via a backup ingress node. A second fault detection link may detect a second fault in a connection between the primary ingress node and the backup ingress node. Following the detection of the first fault and the second fault, the data traffic may be merged from the backup LSP into the primary LSP at the next hop node of the primary ingress node.

In another example embodiment, the disclosure includes a network node to provide ingress fault protection of a primary LSP. A first fault detection link may detect a first fault between the node and a second node. The node may determine whether data traffic is available from a third node. The data traffic may be available when a second fault between the second node and the third node is detected using a second fault detection link; otherwise, the data traffic is unavailable. When the data traffic is available, the node may import the data traffic from the third node into a backup LSP. As such, the data traffic may be merged from the backup LSP into the primary LSP.

In yet another example embodiment, the disclosure includes a network node to provide ingress fault protection of a primary LSP. The network node may monitor a first fault detection link to detect a first fault between the network node and a second network. Additionally, the network node may determine if data traffic is available from a source node. The data traffic may be available when a second fault between a second network node and the source node is detected using a second fault detection link; otherwise, the data traffic is unavailable. In response to detecting the first fault and determining that data traffic is available, the network node may import the data traffic from the source node into a backup LSP. As such, the data traffic may be merged from the backup LSP into the primary LSP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various example embodiments for establishing a backup LSP, detecting a failure involving a primary ingress node of an LSP, and controlling the data traffic delivery from a source node to a next hop node of the primary ingress node via a backup ingress node and the backup LSP. The data traffic may be delivered from a network to the next hop node of the primary ingress node via the backup ingress node and the backup LSP. A network, a source node and/or a backup ingress node may detect a failure of a primary ingress node of an LSP and may reroute the data traffic to a next-hop node of the primary ingress node via the backup ingress node and a backup LSP. The failure of the primary ingress node may be determined by employing one or more fault detection links in order to reduce false-positive failure detections of a primary ingress node. Upon determining a primary ingress node failure has occurred and not a link-failure, the backup ingress node may deliver traffic to the next-hop node of the primary ingress node via the backup LSP. As such, the backup ingress node may prevent duplicate traffic from being delivered in response to a false-positive detection of a primary ingress node. Some examples of protection against failures involving the primary ingress node of an MPLS TE LSP are described in U.S. patent application Ser. No. 12/683,968, titled "Protecting Ingress And Egress Of A Label Switched Path," and U.S. application Ser. No. 12/983,587, titled "System And Method For Protecting Ingress and Egress Of A Point-To-Multipoint Label Switched Path," both of which are incorporated herein by reference.

Figure 1:
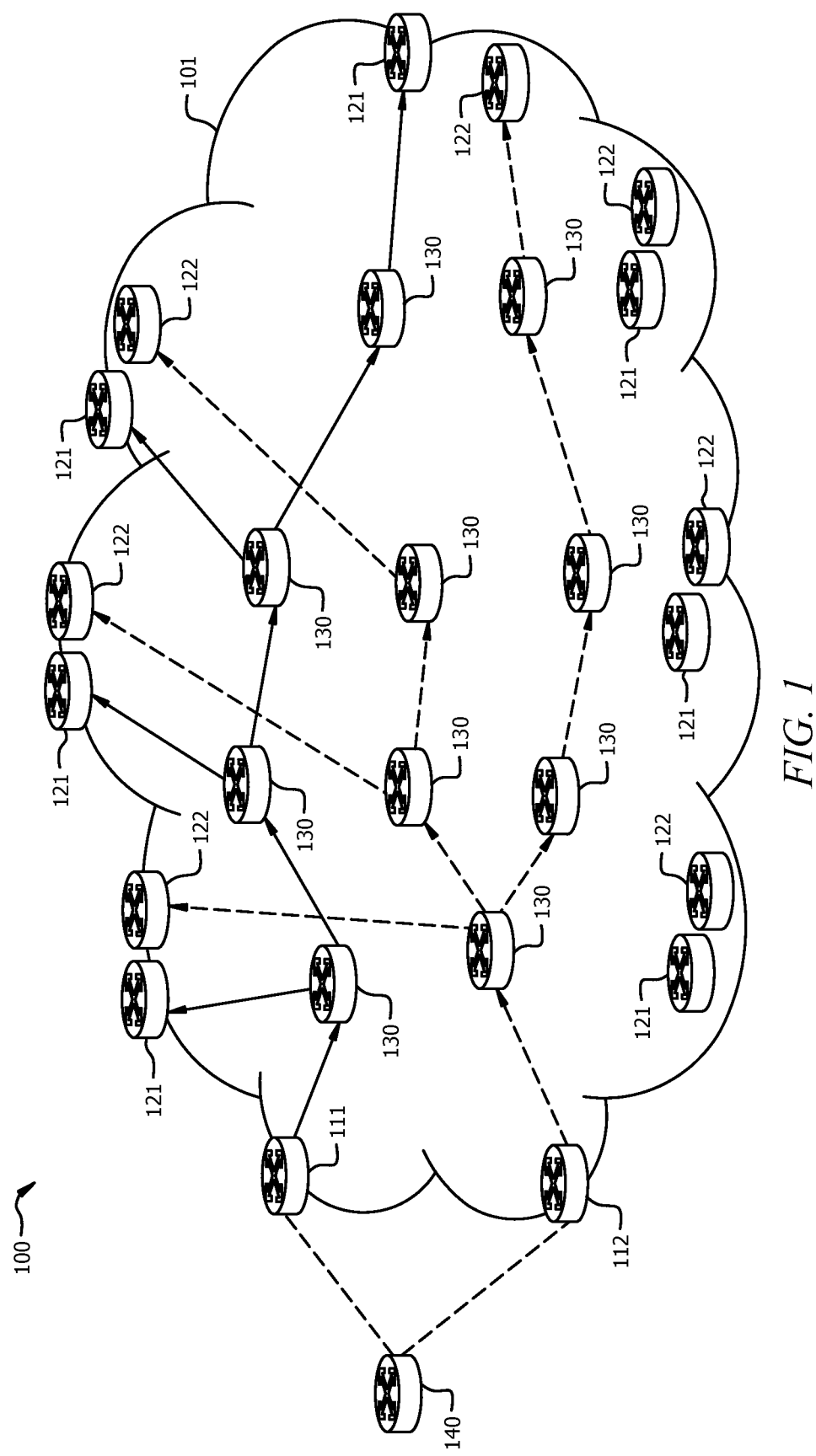
FIG. 1 is a schematic diagram of an embodiment of a conventional label switched system.

FIG. 1 is a schematic diagram of an embodiment of a conventional label switched system 100. The label switched system 100 may comprise a source node 140 in data communication with a label switched network 101 having a plurality of network nodes. The label switched network 101 may be configured to transport data traffic (e.g., data packets or frames) from the source node 140 to a second network (e.g., an external network) or client (not shown). The label switched network 101 may be configured to route or switch data traffic along paths using a label switching protocol, for example, using MPLS or generalized multiprotocol label switching (GMPLS). Alternatively, the packets may be routed or switched via any other suitable protocol as would be appreciated by one of ordinary skill in the art upon viewing this disclosure. The label switched network 101 may be configured to establish a plurality of LSPs between at least some of the network nodes and/or between the source node 140 and at least some of the network nodes. An LSP may be a point-to-point (P2P) LSP or point-to-multipoint (P2MP) LSP and may be used to transport data traffic (e.g., using packets and packet labels for routing).

The plurality of network nodes may comprise a plurality of edge nodes and a plurality of internal nodes 130. The edge nodes and internal nodes 130 may be any devices or components that support the transportation of data traffic (e.g., data packets) through the label switched network 101. For example, the network nodes may include switches, routers, any other suitable network device for communicating packets as would be appreciated by one of ordinary skill in the art upon viewing this disclosure, or combinations thereof. The network nodes may be configured to receive data from other network nodes, to determine which network nodes to send the data to (e.g., via logic circuitry or a forwarding table), and/or to transmit the data to other network nodes. In some embodiments, at least some of the network nodes may be label switched routers (LSRs) and may be configured to modify or update the labels of the packets transported in the label switched network 101. Additionally, at least some of the network nodes may be label edge routers (LERs) and may be configured to insert or remove the labels of the packets transported between the label switched network 101 and the source node 140.

In FIG. 1, the plurality of edge nodes are illustrated as a first ingress node (e.g., a primary ingress node) 111, a second ingress node (e.g., a backup ingress node) 112, a first egress node 121, and/or a second egress node 122. In an example embodiment where the label switched network 101 is configured to provide a P2MP LSP, the first ingress node 111 and second ingress node 112 may be referred to as root nodes, and the first egress nodes 121 and second egress nodes 122 may be referred to as leaf nodes or destination nodes. Additionally, the label switched network 101 may comprise a plurality of internal nodes 130, that may be configured to communicate with other internal nodes 130 and/or with the edge nodes. The first ingress node 111 and the second ingress node 112 may be configured to communicate with a source node 140 that is coupled to the label switched network 101. As such, the first ingress node 111 and the second ingress node 112 may each be configured to transport data traffic between the source node 140 and the label switched network 101. In some embodiments, some of the first egress nodes 121 and second egress nodes 122 may be grouped in pairs such that each pair may be coupled to a second network or a client (not shown). Although FIG. 1 illustrates that the first ingress node 111 and the second ingress node 112 transport traffic between the source node 140 and the label switched network 101, in another example embodiment, the source node 140 may be a network (e.g., an IP network).

The label switched network 101 comprises a first P2MP LSP configured to transport multicast data traffic from the source node 140 to one or more second networks or clients (not shown). The first P2MP LSP comprises the first ingress node 111, a plurality of internal nodes 130, and a plurality of first egress nodes 121. The first P2MP LSP is shown using solid arrow lines in FIG. 1. The label switched network 101 further comprises a second P2MP LSP configured to protect the first P2MP LSP. For example, the second P2MP LSP may be configured to forward traffic from the source node 140 to the second networks or clients (not shown) when the primary ingress node of first P2MP LSP fails. The second P2MP LSP comprises the second ingress node 112, a plurality of internal nodes 130, and a plurality of second egress nodes 122. The second P2MP LSP is shown using dashed arrow lines in FIG. 1. In some embodiments, at least some of the second egress nodes 122 of the second LSP may be paired with at least some of the first egress nodes 121 of the first P2MP LSP.

Figure 2:
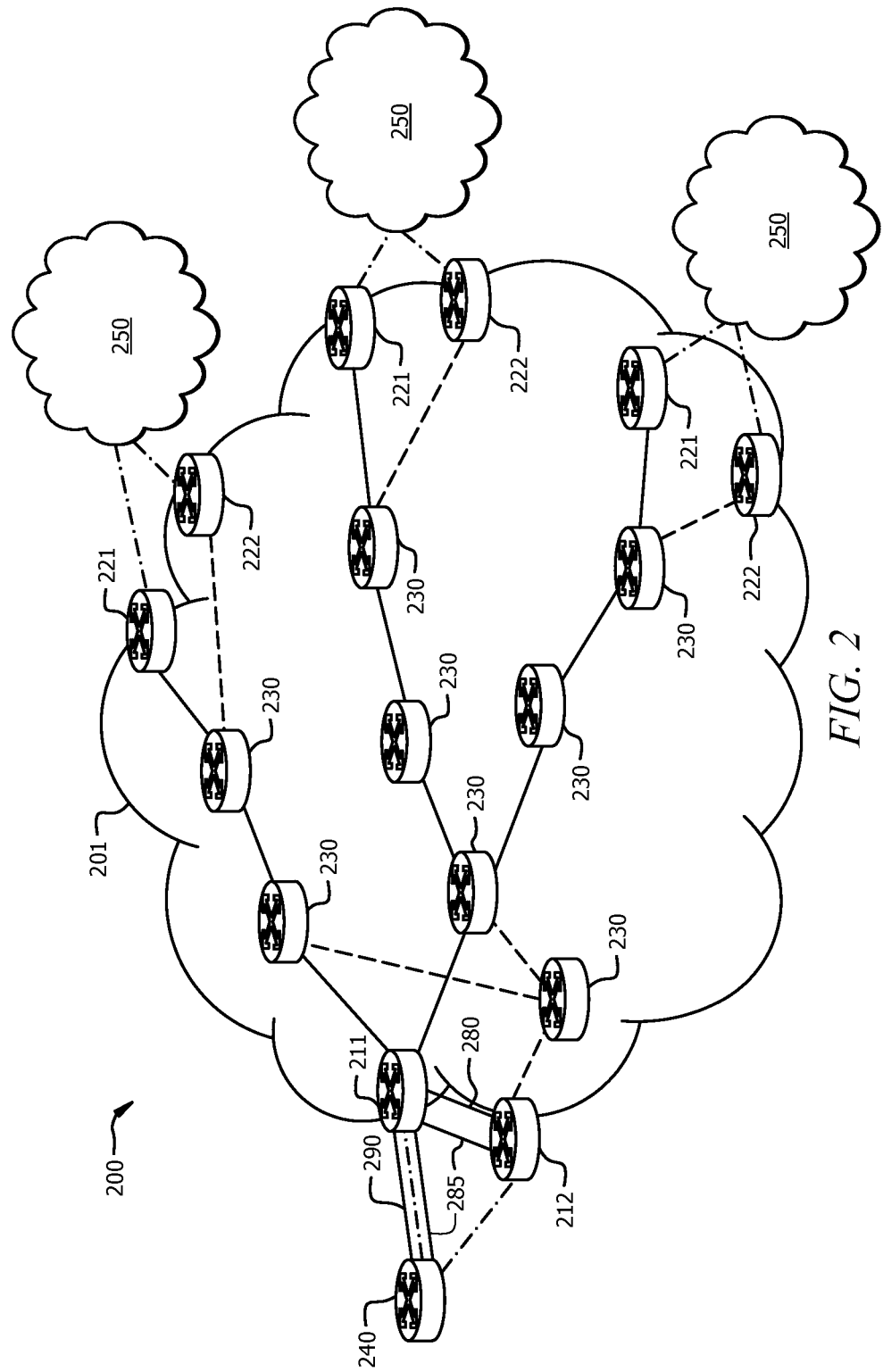
FIG. 2 is a schematic diagram of an example embodiment of a label switched system.

FIG. 2 is a schematic diagram of an example embodiment of a label switched system 200. The label switched system 200 comprises a source node 240 in data communication with a label switched network 201 (e.g., a packet switched network) having a plurality of network nodes. The source node 240 may be a network or source node that is external or distinct from the label switched network 201. Alternatively, the source node 240 may be a portion of and/or incorporated within the label switched network 201. The label switched network 201 comprises a first ingress node (e.g., a primary ingress node) 211, a second ingress node (e.g., a backup ingress node) 212, a plurality of internal nodes 230, a plurality of first egress nodes 221, and a plurality second egress nodes 222.

The first ingress node 211 may be configured to communicate with the second ingress node 212, to indicate that ingress fault protection is available, and to identify application data traffic. In one example embodiment, the second ingress node 212 may be predetermined by an operator. Alternatively, the second ingress node 212 may be configured to be selected autonomously (e.g., using a path computation element (PCE)) based on network topology information. For example, a PCE may be configured to inform the first ingress node 211 of the selected second ingress node 212. The second ingress node 212 may be configured as a backup ingress node for the first ingress node 211 and to establish a second LSP (e.g., a backup LSP). In response to detecting a failure involving the first ingress node 211, the second ingress node 212 may be configured to receive data traffic for the first LSP from the source node 240 and to import the data traffic into the second LSP and the next-hop node of the first ingress node 211 such that the data traffic is merged into the first LSP. In an example embodiment, the second LSP may be established as described in U.S. patent application Ser. No. 12/683,968, titled "Protecting Ingress And Egress Of A Label Switched Path." The label switched network 201 may be configured to communicate with the source node 240 via the first ingress node 211 and the second ingress node 212. The label switched network 201 may be configured to communicate with one or more second networks or clients 250 via one or more first egress nodes 221 and/or one or more second egress nodes 222. Although the label switched network 201 is illustrated comprising a source node 240, a first ingress node 211, a second ingress node 212, a plurality of internal nodes 230, a plurality of first egress nodes 221, a plurality second egress nodes 222, and a plurality of second networks or clients 250, in one or more example embodiments, any other suitable configuration and/or combinations thereof may be additionally or alternatively incorporated within the label switched network 201 as would be appreciated by one of ordinary skill in the art upon viewing this disclosure.

The label switched network 201 may be configured such that a plurality of LSPs (e.g., P2P LSP and/or P2MP LSP) may be established between the network nodes and/or between the networks and at least some of the network nodes. The label switched network 201 may comprise a first LSP (e.g., a P2MP LSP) configured to transport multicast data traffic from the source node 240 to one or more of the second networks or clients 250. The first LSP may comprise the first ingress node 211, one or more internal nodes, and one or more first egress nodes 221. The label switched network 201 further comprises a second LSP (e.g., a backup P2MP LSP or sub-tree). The second LSP may comprise one or more bypass P2P LSPs and/or P2MP LSPs. For example, the second LSP may comprise a path from the second ingress node 212 to one or more next-hop nodes of the first ingress node 211 of the first LSP. The second P2MP LSP may comprise one or more of the same internal nodes 230 of the first P2MP LSP and/or one or more different internal nodes 230 than the first P2MP LSP.

The second ingress node 212 may be configured to receive information about the first LSP from the first ingress node 211 and to establish the second LSP. The second ingress node 212 may receive information about the first LSP, such as, a backup ingress address, an ingress address, a traffic descriptor, one or more label routes, an Explicit Route Object (ERO), a Record Route Object (RRO), a routing table, a forwarding table or states, and/or any other routing information as would be appreciated by one of ordinary skill in the art upon viewing this disclosure, or combinations thereof. The information may be communicated via an Open Shortest Path First (OSPF) type 9 Link State Advertisement (LSA) with a new Type Length Value (TLV) for the information, via a resource reservation protocol-traffic engineering (RSVP-TE) PATH message, or any other suitable protocol. For example, the second ingress node 212 may receive an RSVP-TE PATH message comprising a message object and/or a flag indicating ingress fault protection from the first ingress node 211. Upon receiving information about the first LSP from the first ingress node 211, the second ingress node 212 may be configured to use the information about the first LSP to establish a second LSP and to create a forwarding state. For example, a second LSP may be established by computing a path from the second ingress node 212 to the next-hop nodes of the first ingress node 211, setting up the second LSP along the computed path, receiving a PATH message from the first ingress node 211, sending a reservation (RESV) message indicating ingress fault protection is available to the first ingress node 211 in response to the PATH message, and creating a forwarding state (e.g., forwarding table) for the second LSP. The PATH and RESV messages may be similar to the PATH and RESV messages defined by the Internet Engineering Task Force (IETF). Additionally, the second ingress node 212 may be configured to receive other messages from the first ingress node 211, such that the second ingress node 212 has access to the PATH messages needed for a modification to be sent to refresh a control-plane state after a failure.

The label switched system 200 may further comprise one or more failure detection links. Failure detection links used by the label switched system 200 may include a bidirectional fault detection (BFD) session, a P2P LSP, and/or any other suitable failure detection link. The failure detection link may comprise a link between two network nodes or a multi-hop link between a plurality of network nodes. In an example embodiment, the failure detection link may comprise a BFD session 280 between the first ingress node 211 and the second ingress node 212, a BFD session 290 between the source node 240 and the first ingress node 211, and/or a BFD session 285 between the source node 240 and the second ingress node 212 via the first ingress node 211.

The second ingress node 212 may be configured to detect a failure involving the first ingress node 211 using one or more of the failure detection links (e.g., BFD session 280 and/or BFD session 285). As such, the second ingress node 212 may be configured in a source-backup detector mode (e.g., fault detection is performed in conjunction with a source node) or a backup detector mode (e.g., fault detection is performed by the backup ingress node). When the second ingress node 212 detects a failure in the first ingress node 211, the second ingress node 212 may be configured to receive the data traffic intended for the first LSP from the source node 240 and to import the data traffic into the second LSP and the next-hop nodes of the first ingress node 211 such that the data traffic is merged into the first LSP. In an example embodiment, the second ingress node 212 may detect a failure of the connection between the second ingress node 212 and the first ingress node 211 by determining that BFD session 280 is down (e.g., not operating). In another example embodiment where the failure detection link uses both the BFD session 285 and the BFD session 280, the second ingress node 212 may be configured to detect a failure of the connection between the first ingress node 211 and the source node 240 by determining the BFD session 285 is down and that the BFD session 280 is up (e.g., operating). Additionally, the second ingress node 212 may be configured to detect a failure in the first ingress node 211 by determining that BFD session 285 and BFD session 280 are both down. In response to detecting a failure of the connection between the first ingress node 211 and the source node 240 or detecting a failure in the first ingress node 211, the second ingress node 212 may be configured to receive the data traffic for the first LSP from the source node 240 and to import the data traffic into the second LSP and the next-hop nodes of the first ingress node 211 such that the data traffic is merged into the first LSP.

The source node 240 may be configured to detect a failure involving the first ingress node 211 using one or more of the failure detection links (e.g., BFD session 290 and/or BFD session 285). As such, the source node 240 may be configured in a source detector mode (e.g., fault detection is performed by the source node) or a source-backup detector mode. The source node 240 may be configured to detect a failure involving the first ingress node 211 by determining that the BFD session 290 is down. For example, the source node 240 may detect a failure of the connection between the source node 240 and the first ingress node 211 by determining that BFD session 290 is down. In response to detecting a failure involving the first ingress node 211, the source node 240 may be configured to send the traffic intended for the first LSP to the second ingress node 212 and to stop sending traffic to the first ingress node 211. As such, the source node 240 switches traffic flow from the first ingress node 211 to the second ingress node 212 when the BFD session 290 is down.

Figure 3:
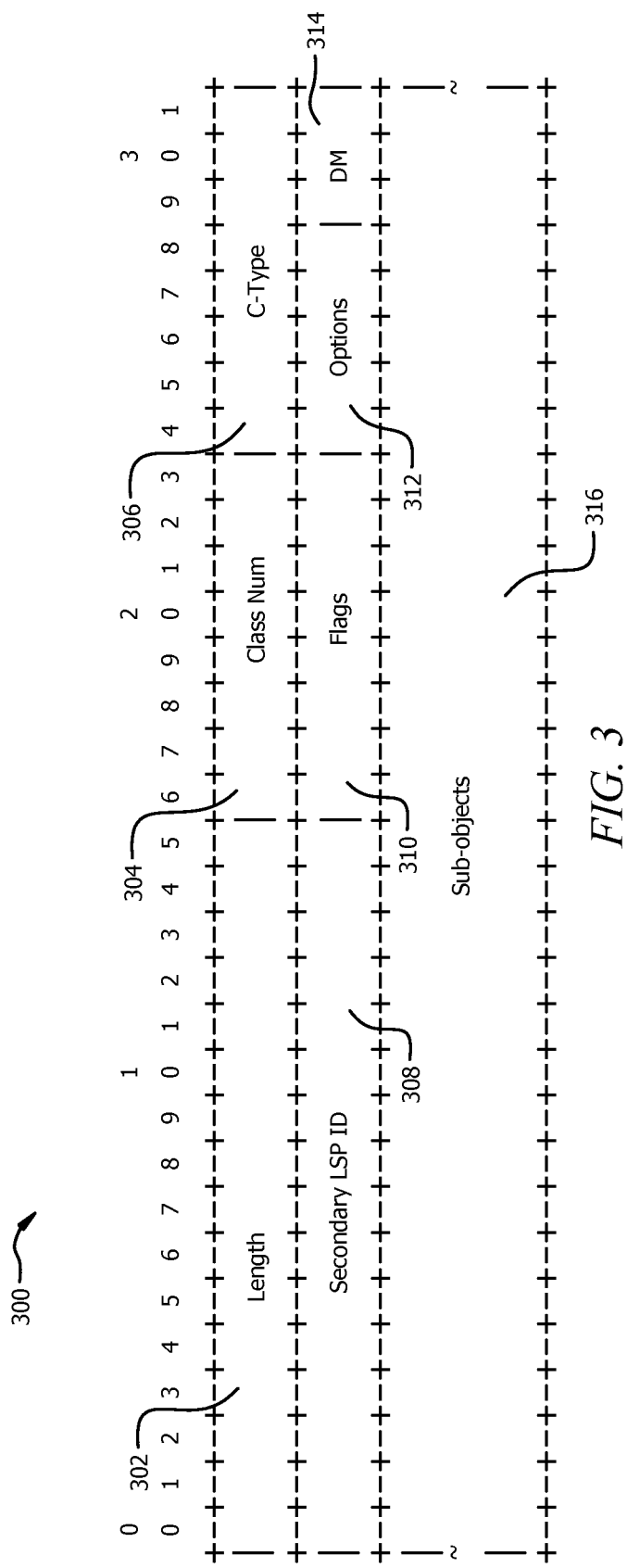
FIG. 3 is an example embodiment of a message object.

FIG. 3 is an example embodiment of a message object 300. Message object 300 may be employed to signal ingress fault detection and/or to provide control information to a backup ingress node to provide ingress fault detection. Message object 300 may be configured to be an independent message or incorporated within another message. For example, message object 300 may be inserted into a PATH message being communicated between a primary ingress node and a backup ingress node. Message object 300 comprises a length field 302, a class number field 304, a class type field 306, a secondary LSP identifier (ID) 308, a flag field 310, an options field 312, a detection mode field 314, and a sub-objects field 316. The length field 302 may be about two bytes long and may indicate the total length (e.g., in bytes) of the message object 300. The class number field 304 may be about one byte long and may identify a message object. The class type field 306 may be about one byte long and may identify a message object type. The secondary LSP ID field 308 may be about two bytes long and may comprise an ID, which may be used by a backup ingress node to set up a backup LSP such that resources may be shared between the backup LSP and an existing LSP. The flag field 310 may be about one byte long and may communicate status information from the backup ingress to the primary ingress. For example, the flag field 310 may indicate whether ingress fault protection is available or in use. The options field 312 may be about five bits long and may indicate a desired behavior to a backup ingress node and/or a next-hop node. For example, the option field 312 may indicate to use a P2MP backup LSP to protect the primary ingress node. The detection mode field 314 may be about three bits long and may indicate a desired failure detection mode. For example, the detection mode field 314 may indicate that a backup ingress node and/or a source node may be responsible for detecting an ingress node failure and/or for redirecting data traffic. The sub-objects field 316 may comprise one or more sub-objects which may comprise information for establishing a backup LSP and/or for controlling a backup LSP, as will be disclosed herein. In an example embodiment, the sub-objects field 316 may be about eight bytes long.

Figure 4:
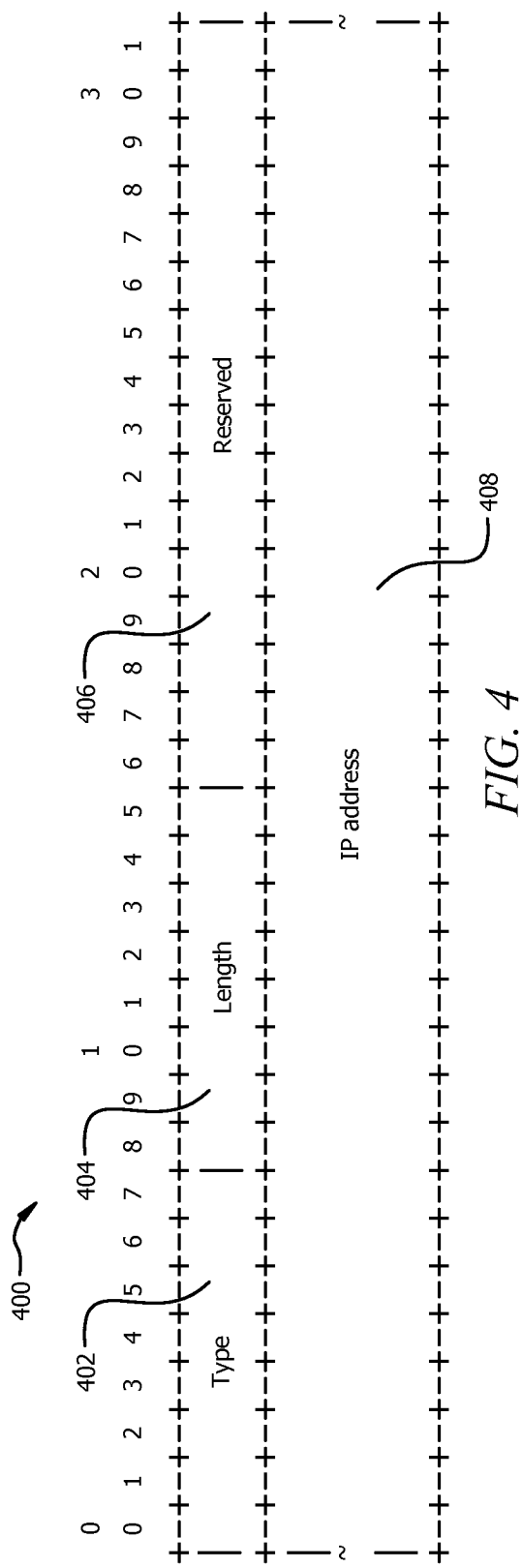
FIG. 4 is an example embodiment of a message sub-object used to communicate a backup ingress node IP address or a primary ingress node IP address.

FIG. 4 is an example embodiment of a message sub-object 400 used to communicate a backup ingress node IP address or a primary ingress node IP address. Sub-object 400 may comprise a type field 402, a length field 404, a reserved field 406, and an IP address field 408. The type field 402 may be about one byte long and may indicate that the sub-object 400 comprises a backup ingress node IP address or a primary ingress node IP address (e.g., an IP version 4 (IPv4) or IP version 6 (IPv6) address). The length field 404 may be about one byte long and may indicate the total length (e.g., in bytes) of sub-object 400. The reserved field 406 may be about two bytes long and may be filled with zeros. The IP address field 408 may be about four bytes long for an IPv4 address and about eight bytes long for an IPv6 address. The IP address field 408 may indicate the IP address of the backup ingress node or the primary ingress node. For example, the IP address field 408 may comprise a 32-bit unicast IPv4 address or a 128-bit unicast IPv6 address.

Figure 5:
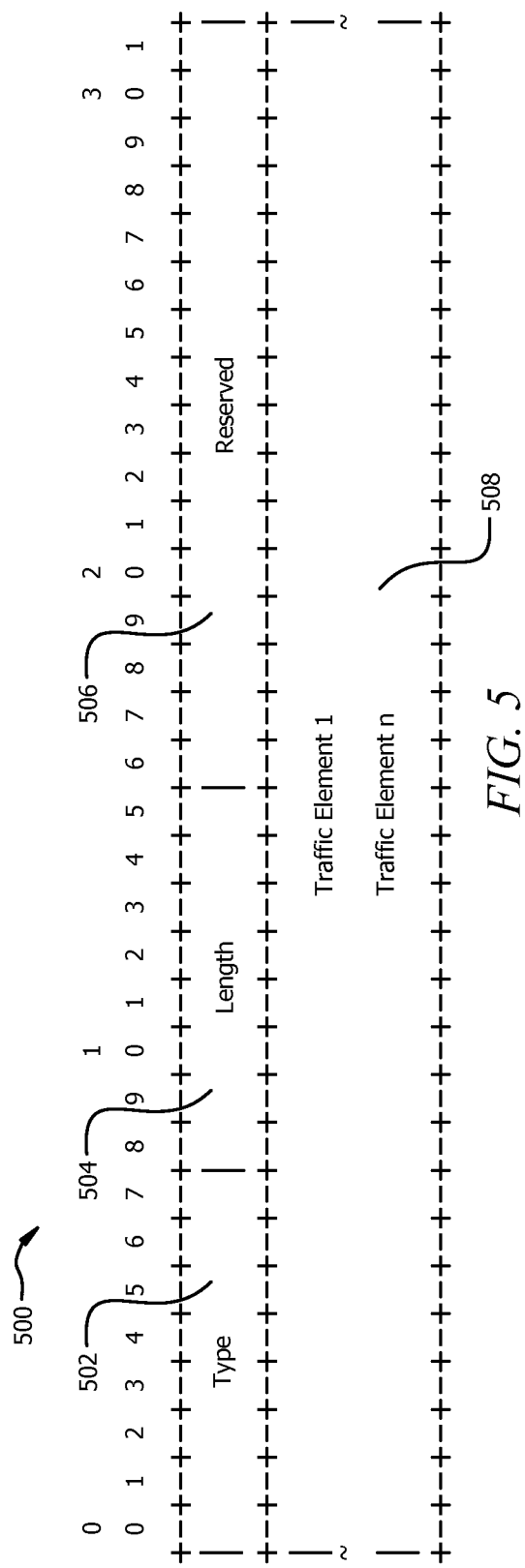
FIG. 5 is an example embodiment of a message sub-object employed to describe the data traffic to be mapped or routed to the backup LSP on the backup ingress.

FIG. 5 is an example embodiment of a message sub-object 500 employed to describe the data traffic to be mapped or routed to the backup LSP on the backup ingress node. Sub-object 500 comprises a type field 502, a length field 504, a reserved field 506, and one or more traffic elements 508. The type field 502 may be about one byte long and may indicate that the sub-object 500 comprises one or more traffic elements. The length field 504 may be about one byte long and may indicate the total length (e.g., in bytes) of sub-object 500. The reserved field 506 may be about two bytes long and may be filled with zeros. Each traffic element 508 may be about four bytes long and may indicate a traffic type. For example, a traffic element 508 may indicate a traffic type as interface traffic and may comprise an index of an interface from which the traffic is imported into the backup LSP. Alternatively, the traffic element 508 may indicate a traffic type as IPv4/IPv6 prefix traffic and may comprise a prefix length and an IPv4/IPv6 address prefix.

Figure 6:
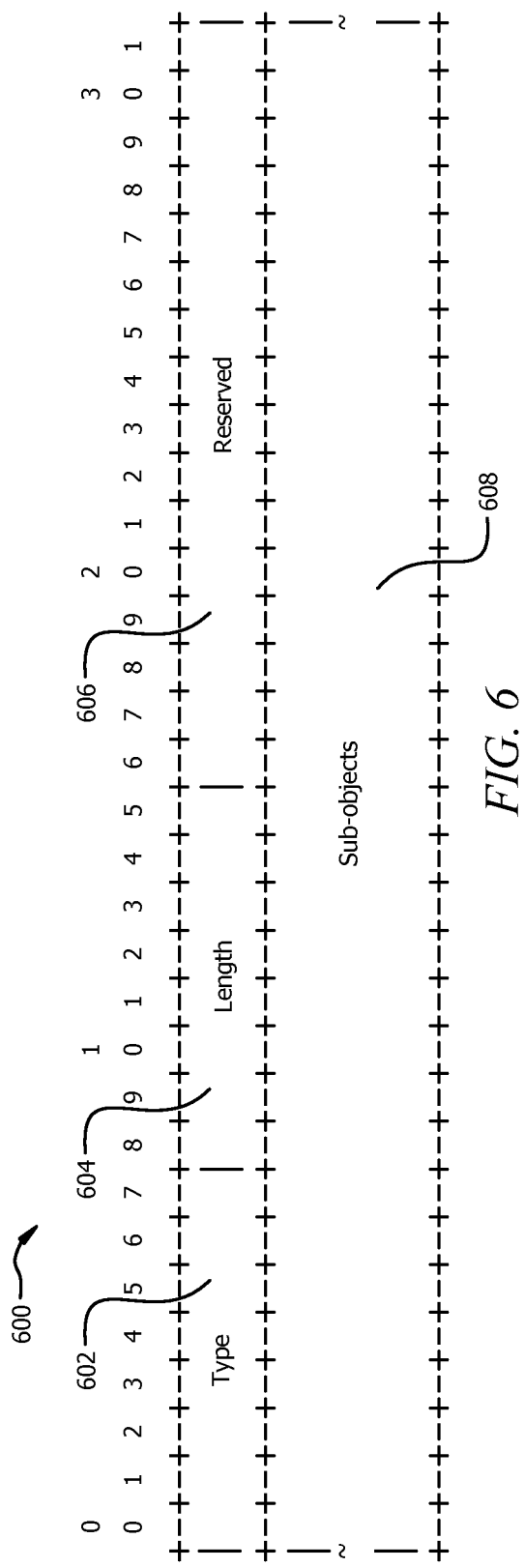
FIG. 6 is an example embodiment of a message sub-object employed to communicate the labels and routes of the next hops for a primary ingress.

FIG. 6 is an example embodiment of a message sub-object 600 employed to communicate the labels and routes of the next hops for a primary ingress node. Sub-object 600 comprises a type field 602, a length field 604, a reserved field 606, and a sub-object field 608. The type field 602 may be about one byte long and may indicate that the sub-object 600 comprises one or more labels and/or routes for the next hops for a primary ingress node. The length field 604 may be about one byte long and may indicate the total length (e.g., in bytes) of sub-object 600. The reserved field 606 may be about two bytes long and may be filled with zeros. The sub-object field 608 may comprise one or more labels and/or routes for the next hops for a primary ingress node. For example, the sub-object field 608 may be about eight bytes long and may comprise the first hops of an LSP and a label paired with each hop. With respect to FIGS. 3-6, it is noted that any data field may be any suitable size as would be appreciated by one of ordinary skill in the art upon viewing this disclosure.

Figure 7:
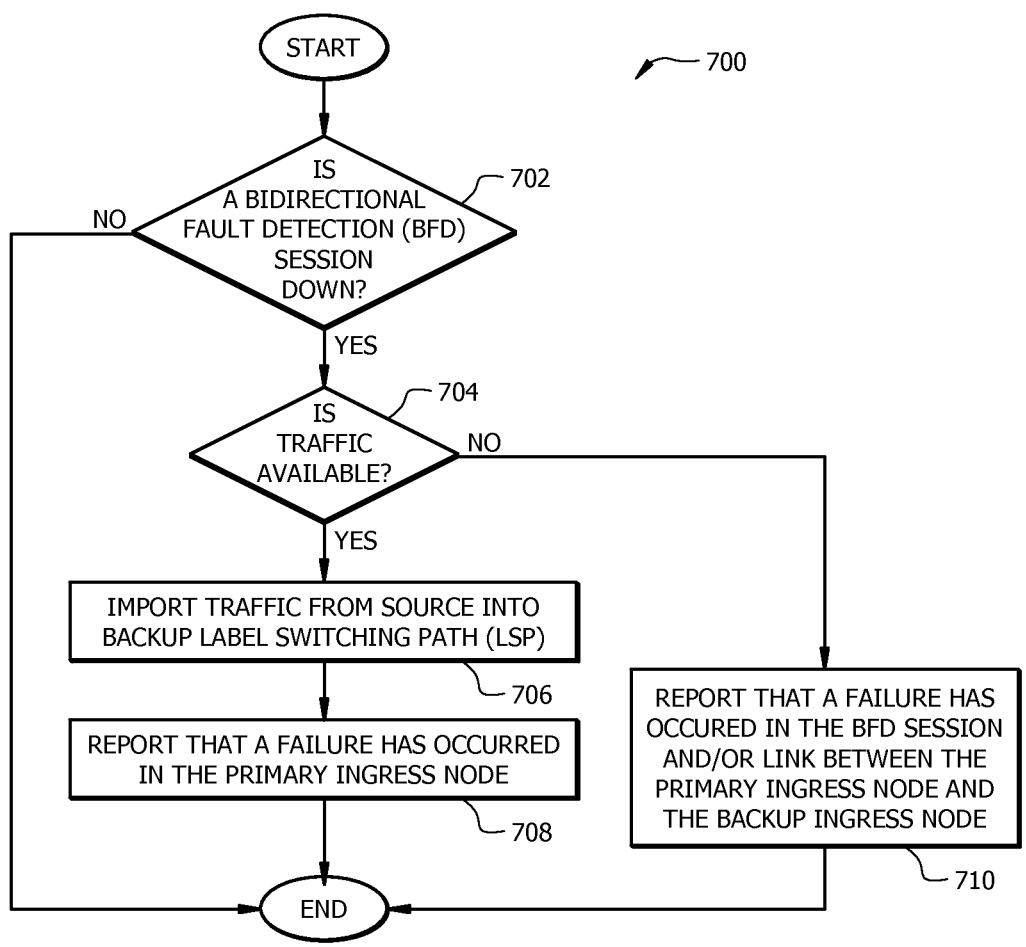
FIG. 7 is a flow chart of an example embodiment of an ingress fault protection method.

FIG. 7 is a flowchart of an example embodiment of an ingress fault protection method 700. In an example embodiment, a backup ingress node (e.g., second ingress node 212 as shown in FIG. 2) may employ method 700 to protect a primary ingress node (e.g., first ingress node 211 as shown in FIG. 2) of a first LSP. Method 700 may be used to detect a failure involving the primary ingress node of a first LSP and to control the traffic delivery from a first network or source node (e.g., a first network or source node 240 as shown in FIG. 2) to the next-hop nodes of the primary ingress node of the first LSP. At step 702, method 700 may determine whether a BFD session (e.g., BFD session 280 as shown in FIG. 2) between a primary ingress node and a backup ingress node is down. If the BFD session is down, then method 700 goes to step 704; otherwise, method 700 ends. At step 704, method 700 may determine if data traffic for the first LSP is available from the first network or source node. If data traffic is available, then method 700 may go to step 706; otherwise, method 700 goes to step 710. At step 706, method 700 may import the data traffic from the first network or source node into a backup LSP and may send control traffic for the primary LSP through the backup LSP (e.g., via the backup ingress node) to the next-hop nodes of the primary ingress node. Method 700 may then proceed to step 708. At step 708, method 700 may report that a failure has occurred in the primary ingress node and then method 700 ends. For example, method 700 may send a warning and/or an event message to a network management entity (e.g., a controller). Returning to step 704, if traffic is not available, method 700 proceeds to step 710. At step 710, method 700 may report that a failure has occurred in the BFD session and/or a link between the primary ingress node and the backup ingress node and the method 700 ends. For example, method 700 may send a warning or an event message to a network management entity.

Figure 8:
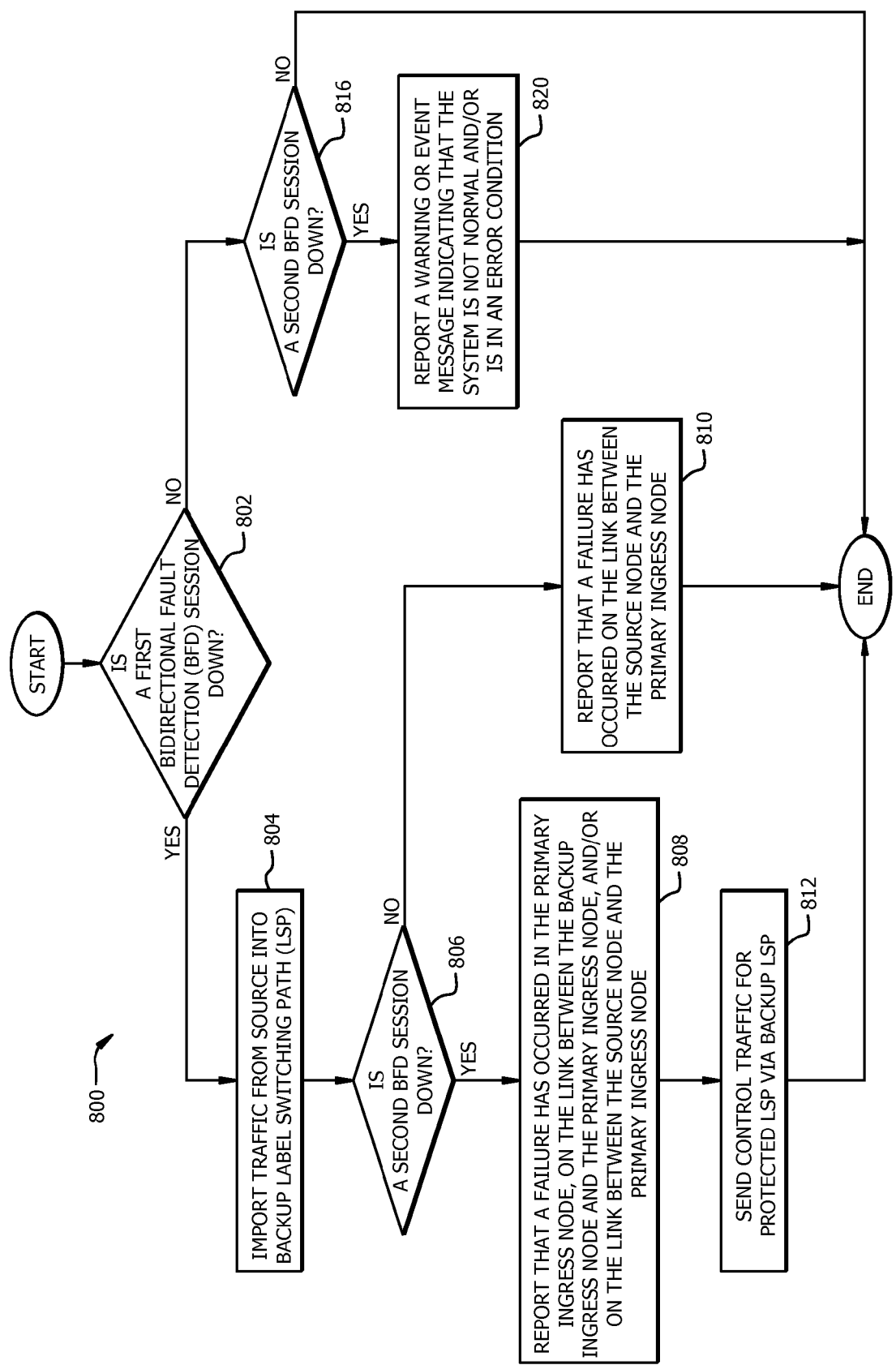
FIG. 8 is a flow chart of another example embodiment of an ingress fault protection method.

FIG. 8 is a flowchart of another example embodiment of an ingress fault protection method 800. In an example embodiment, a backup ingress node may employ method 800 to protect the primary ingress node of the first LSP. Method 800 may be used to detect a failure involving the primary ingress node of a first LSP and to control the data traffic delivery from a first network or source node to the next-hop nodes of the primary ingress node of the first LSP. At step 802, method 800 may determine whether a first BFD session (e.g., BFD session 285 as shown in FIG. 2) between the first network or source node and the backup ingress node via the primary ingress node is down. If the first BFD session is down, then method 800 proceeds to step 804; otherwise, method 800 moves to step 816.

At step 804, method 800 imports data traffic from the first network or source node into a second LSP and proceeds to step 806. At step 806, method 800 may determine whether a second BFD session (e.g., BFD session 280 as shown in FIG. 2) between the backup ingress node and the primary ingress node is down. If the second BFD session is down, then method 800 goes to step 808; otherwise, method 800 goes to step 810. At step 808, method 800 may report that a failure has occurred in the primary ingress node, on the link between the backup ingress node and the primary ingress node, and/or on the link between the source node and the primary ingress node and then proceeds to step 812. At step 812, method 800 may send control traffic for the first LSP through the second LSP (e.g., via the backup ingress node) to the next-hop nodes of the primary ingress node of the first LSP and then method 800 ends. Returning to step 806, if the second BFD session is not down, method 800 proceeds to step 810. At step 810, method 800 may report that a failure has occurred on the link between the source node and the primary ingress node and then method 800 ends. Returning to step 802, if the first BFD session is not down, method 800 proceeds to step 816. At step 816, method 800 may check whether the second BFD session is down. If the second BFD session is down, then method 800 goes to step 820; otherwise, method 800 ends. At step 820, method 800 may report a warning or event message indicating that the system is not normal and/or is in an error condition and then method 800 ends.

Figure 9:
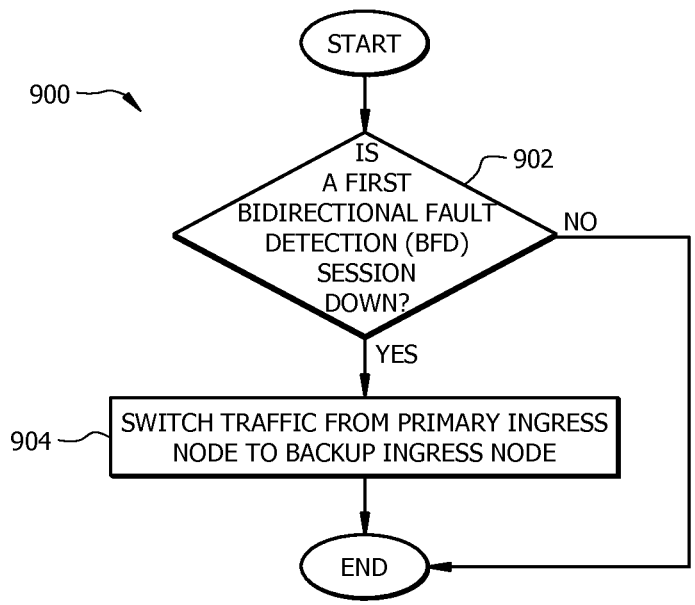
FIG. 9 is a flow chart of another example embodiment of an ingress fault protection method.

FIG. 9 is a flow chart of another example embodiment of an ingress fault protection method 900. In an example embodiment, a first network or source node may employ method 900 to protect the primary ingress node of a first LSP. Method 900 may be used to detect a failure involving the primary ingress node of a first LSP and to control the traffic delivery from a source node to a backup ingress node. At step 902, method 900 may check whether a first BFD session (e.g., a BFD session 290 as shown in FIG. 2) between the source node and the primary ingress node is down. If the first BFD session is down, then method 900 goes to step 904; otherwise, method 900 ends. At step 904, method 900 may switch traffic for the first LSP from the primary ingress node to the backup ingress node and/or the second LSP. In an example embodiment, the traffic may be switched from the primary ingress node to the backup ingress node substantially simultaneously with determining the first BFD session is down. Method 900 may forward the data traffic through the second LSP (e.g., via the backup ingress node) to the next-hop nodes of the primary ingress node of the first LSP and then method 900 ends.

Figure 10:
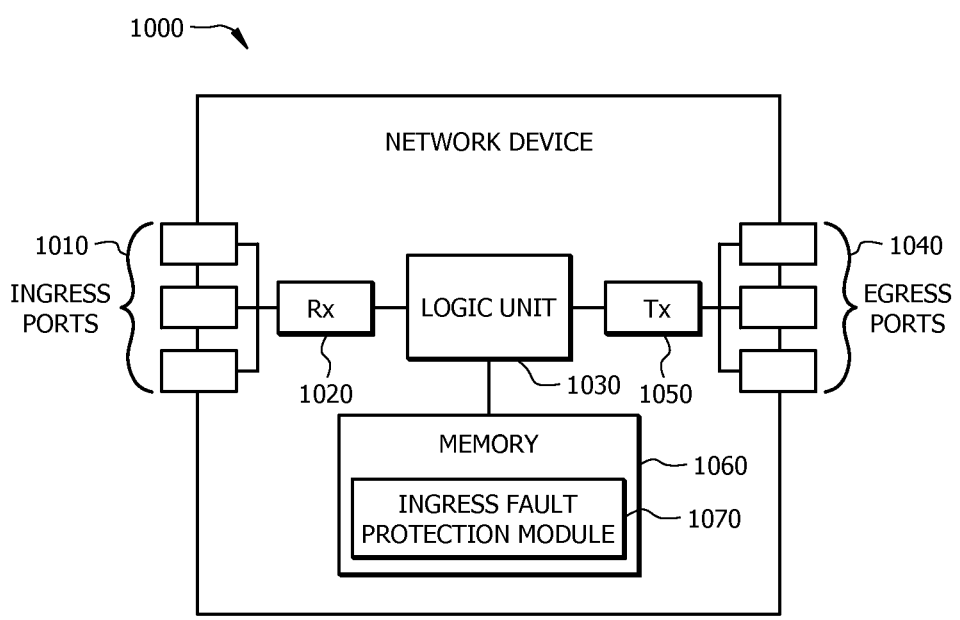
FIG. 10 is a schematic diagram of an example embodiment of a network device.

FIG. 10 is a schematic view of an embodiment of a network device 1000. The network device 1000 may comprise a plurality of ingress ports 1010 and/or receiver (Rx) units 1020 for receiving data, a logic unit or processor 1030 to process signals, a plurality of egress ports 1040 and/or transmitter (Tx) units 1050 for transmitting data to other components, and a memory 1060. The network device 1000 may be suitable for implementing any of the disclosed features, methods, and devices. For example, the network device 1000 may be suitable for implementing the network nodes in FIGS. 1 and 2.

The logic unit 1030, which may be referred to as a central processing unit (CPU), may be in communication with the ingress ports 1010, receiver units 1020, egress ports 1040, transmitter units 1050, and memory 1060. The logic unit 1030 may be implemented as one or more CPU chips, cores (e.g., as a multi-core processor), field-programmable gate arrays (FPGAs), application specific integrated circuits (ASICs), and/or digital signal processors (DSPs), and/or may be part of one or more ASICs.

The memory 1060 may be comprised of one or more disks, tape drives, optical disc drives, or solid-state drives. Memory 1060 may be used for non-volatile storage of data and as an over-flow data storage device; may be used to store programs when such programs are selected for execution; and may be used to store instructions and data that are read during program execution. The memory 1060 may be volatile and/or non-volatile and may be read-only memory (ROM), random-access memory (RAM), ternary content-addressable memory (TCAM), static random-access memory (SRAM), another suitable type of memory, or any combination thereof. The memory 1060 may comprise an ingress fault protection module 1070 having computer executable instructions that when executed by the logic unit 1030 may configure the network device to perform an ingress fault protection method, for example, methods 700, 800, and 900 as described in FIGS. 7-9, respectively. For example, the memory 1060 may comprise computer executable instructions to send/receive data packets, to establish an LSP, to establish and monitor a fault detection link or session, to generate a fault or warning report, to communicate with a network management entity, and/or any other additional instructions as would be appreciated by one of ordinary skill in the art upon viewing this disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

I claim:

1. A method for providing ingress fault protection in a label switched network, the method comprises:
    sending data traffic from a source node to a first label switched path (LSP) via a first ingress node;
    detecting, by a second ingress node and the source node, a first fault of the first ingress node using a first fault detection link between the source node and the first ingress node;
    sending the data traffic from the source node to the second ingress node in response to detecting the first fault by the source node;
    detecting, by the second ingress node, a second fault using a second fault detection link between the first ingress node and the second ingress node; and
    importing the data traffic into a second LSP in response to detecting that the first fault and the second fault exist, wherein importing the data traffic into the second LSP merges the data traffic from the second LSP into the first LSP at a next-hop node of the first ingress node, and wherein the data traffic is no longer sent to the first LSP via the first ingress node after the first fault.

2. The method of claim 1, further comprising communicating information about the first LSP to the second ingress node and establishing the second LSP based on the information about the first LSP, wherein the information about the first LSP comprises a path and a label paired with the path.

3. The method of claim 1, wherein the first fault detection link and the second fault detection link are bidirectional fault detection (BFD) sessions.

4. The method of claim 1, further comprising sending a message indicating the first fault and the second fault exist.

5. The method of claim 4, wherein indicating the first fault and the second fault exist comprises sending an event message to a network management entity.

6. The method of claim 1, wherein the source node is external to the label switched network.

7. The method of claim 1, wherein the data traffic switches simultaneously from the first LSP via the first ingress node to the second LSP via the second ingress node.

8. The method of claim 1, wherein the first LSP is a point-to-multipoint LSP.

9. The method of claim 1, wherein the second LSP is a point-to-point LSP.

10. A method for providing ingress fault protection within a node comprising:
    detecting a first fault using a fault detection link between the node and a second node;
    determining that data traffic is available from a third node, wherein the data traffic is available when a second fault exists in a second fault detection link between the third node and the second node, and wherein the data traffic is unavailable when the second fault does not exist in the second fault detection link between the third node and the second node;
    importing the data traffic from the third node into a first label switched path (LSP), wherein importing the data traffic is in response to determining that the data traffic is available from the third node and detecting the first fault; and
    merging the data traffic from the third node into a second LSP via the first LSP,
    wherein the node is a backup ingress node and the second node is a primary ingress node, and
    wherein the first fault is detected by the node and the second fault is detected by the node and the third node.

11. The method of claim 10, further comprising receiving information about the second LSP and establishing the first LSP based on the information about the second LSP, wherein the information about the second LSP comprises a next-hop node for the second node.

12. The method of claim 10, wherein merging the data traffic from the third node into the second LSP comprises sending the data traffic to a next-hop node of the second node.

13. The method of claim 10, wherein the first fault detection link and the second fault detection link are bidirectional fault detection (BFD) sessions.

14. The method of claim 10, further comprising sending an event message indicating the presence of the first fault and the second fault.

15. A computer program product comprising computer executable instructions stored on a non-transitory computer readable medium such that when executed by a processor causes a network node to:
    monitor a first fault detection link between the network node and a second network node to detect a first fault in the first fault detection link;

determine that data traffic is available from a source, wherein the data traffic is available when a second fault exists in a second fault detection link between the source and the second network node, and wherein the data traffic is unavailable when the second fault does not exist in the second fault detection link between the source and the second network node;

import the data traffic from the source into a first label switched path (LSP), wherein importing the data traffic is in response to detecting the first fault exists and determining that the data traffic is available from the source; and merging the data traffic from the source into a second LSP via the first LSP, wherein the network node is a backup ingress node and the second network node is a primary ingress node, and wherein the first fault is detected by the network node and the second fault is detected by the network node and the source.

16. The computer program product of claim 15, further configured to receive information about the second LSP and establish the first LSP based on the information about the second LSP, wherein the information about the second LSP comprises a path and a label paired with the path.

17. The computer program product of claim 15, wherein merging the data traffic from the source node into the second LSP comprises sending the data traffic to a next-hop node of the second network node.

18. The computer program product of claim 15, wherein the first fault detection link and the second fault detection link are bidirectional fault detection (BFD) sessions.

19. The computer program product of claim 15, wherein the computer executable instructions when executed by the processor causes the network node to send a message indicating the presence of the first fault and the second fault.

20. The computer program product of claim 19, wherein sending a message indicating the presence of the first fault and the second fault comprises sending a report to a network management entity.

* * * * *